United States Patent
Whalen et al.

[15] 3,681,753
[45] Aug. 1, 1972

[54] ELECTRONIC FUEL LEVEL WARNING DEVICE

[72] Inventors: George J. Whalen, 612 Woodland Hills, White Plains, N.Y. 10604; Rudolf F. Graf, 111 Van Etten Blvd., New Rochelle, N.Y. 14620

[22] Filed: Aug. 5, 1970

[21] Appl. No.: 61,377

[52] U.S. Cl. ............................... 340/59, 340/244 B
[51] Int. Cl. ................................................ B60q 1/00
[58] Field of Search ............... 340/59, 244 B, 81 F; 307/252 H, 252 J, 10 R

[56] References Cited
UNITED STATES PATENTS

| | | | |
|---|---|---|---|
| 3,333,469 | 8/1967 | Godfrey | 340/244 B |
| 2,892,996 | 6/1959 | Hollins | 340/81 F |
| 2,835,885 | 5/1958 | Boddy | 340/59 |
| 3,461,345 | 8/1969 | Gilbert | 307/252.51 |

*Primary Examiner*—John W. Caldwell
*Assistant Examiner*—Glen R. Swann, III
*Attorney*—Kenneth S. Goldfarb

[57] ABSTRACT

An electronic system for providing a warning when the gasoline level in a fuel tank falls to a predetermined level. A flashing light indication warns the motorist when the predetermined level is reached. The flashing light is actuated through a silicon controlled rectifier by a float in the fuel tank provides a signal through an electronic assembly to activate the silicon controlled rectifier.

3 Claims, 1 Drawing Figure

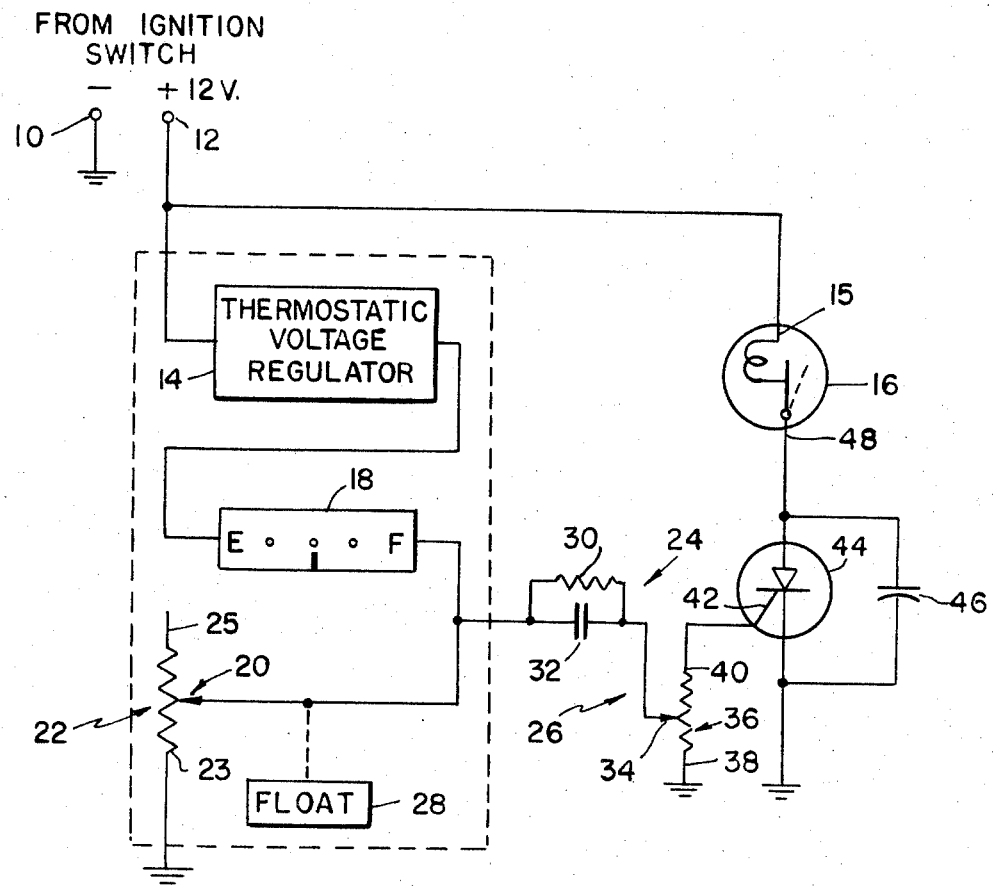
INVENTORS
GEORGE J. WHALEN
RUDOLF F. GRAF
ATTORNEY

ELECTRONIC FUEL LEVEL WARNING DEVICE

BACKGROUND OF THE INVENTION

This invention relates to a warning system and, more particularly, to a warning system providing a flashing visual signal when the fuel level in a fuel tank falls to a predetermined level.

Frequently, motorists run out of gasoline because the warning provided when the fuel tank is at a low level is insufficient. With some automobiles, a reserve tank is provided which is activated by the motorist when the main tank becomes empty. In a sense, the reserve tank system provides a discrete indication of the level, while the more common fuel guages provide a steady visual indication of the level.

An object of the present invention is to provide an improved warning system when fuel in a tank drops to a predetermined level.

Another object of the present invention is to provide an improved visual warning signal which will effectively call attention to the sensed condition.

Still another object of the present invention is to provide a compact, sturdy and efficient warning system.

Another object of the present invention is to provide a warning system suitable for easy installation in automobiles.

Still another object of the present invention is to provide a reliable electronic warning system.

SUMMARY OF THE INVENTION

In accordance with the principles of the present invention, the above objects are accomplished by providing a warning system including first means for sensing the fuel level, second means for triggering a flashing light when the fuel falls below a predetermined level, and third means for terminating the operation of the flashing light when the fuel rises above the predetermined level. A float in the fuel tank is connected to the wiper arm of a variable resistor. As the fuel falls to the predetermined level a pulse of correspondingly varied amplitude is delivered to the gate electrode of a silicon controlled rectifier (SCR). A self-flashing lamp is connected to the SCR and flashes when the SCR is triggered into its conducting state. As the tank is replenished, the float rises lowering the pulse level delivered to the SCR which fails to trigger it into its conducting state.

The accompanying FIGURE is a schematic diagram of an embodiment of the present invention.

DETAILED DESCRIPTION

The electronic warning system of the present invention may find wide applicability in many different type fuel systems. For purposes of illustration, it will be described with reference to an automobile being provided with a 12-volt system.

The negative electrode 10 of the 12 volt power supply is connected to ground while the positive electrode 12 is connected to one side of thermostatic voltage regulator 14 and to one side 15 of a self-flashing lamp 16. Both thermostatic voltage regulator 14 and self-flashing lamp 16 are well known devices with the lamp, preferably, having a built-in thermal switch which opens and closes as a function of the lamp filament temperature. The other side of regulator 14 is connected through an indicator gauge 18, such as a gasoline gauge to the wiper arm 20 of a variable resistor 22 and to one side of a wave shaping network 24 and voltage dividing network 26. One end 23 of variable resistor 22 is connected to ground while the other end 25 is floating. The gauge 18, preferably, is a thermally actuated gauge maintaining a stable reading upon receiving periodic pulses of current from regulator 14. A float 28 which rests on top of the liquid or fuel and provides an indication of the fuel level controls the position of wiper arm 20. It will be recognized by those skilled in the art that regulator 14, gauge 18, variable resistor 22, and float 28, all enclosed within the dotted lines, are standard elements in an automobile.

The wave shaping network 24 comprises a parallel combination of a resistor 30 and a capacitor 32. One side of this parallel combination is connected to the above described wiper arm 20 while the other side of this parallel combination 24 is connected to the variable arm 34 of a potentiometer 36. One end 38 of potentiometer 36 is connected to the gate terminal 42 of a gated semi-conductor device, preferably, a silicon controlled rectifier (SCR) 44. A silicon-controlled rectifier is a latching type relay which normally is not conducting. When triggered into its conducting state, it will continue conducting until the current passing from its anode to cathode falls below a predetermined level. It will not conduct again until properly triggered, which is independent of the anode to cathode voltage. A bridging capacitor 46 is connected between the anode and cathode terminals of SCR 44 while the other side 48 of the flashing lamp is connected to the anode terminal of SCR 44. The cathode terminal of SCR 44 is connected to ground.

While the above sets forth a description of the elements illustrating the principles of the present invention, the following describes its operation. When the fuel tank is full, the wiper arm 20 is near the ground side 23 of the resistor 22, and little or no voltage is developed across resistor 22. As fuel is consumed and the fuel level falls, the float 28 moves wiper arm 20 away from the ground terminal 23 increasing the voltage developed across resistor 22. Simultaneously, current through the visual gauge 18 is decreased presenting a visual readout of the fuel level to the motorist.

Thermostatic voltage regulator 14 periodically emits a pulse of current through the gauge 18 maintaining a stable reading on the gauge. Voltage divider network 26 senses the pulse amplitude across resistor 22, and a portion thereof appears across resistor 36. Variable resistor 36 enables the trigger point corresponding to a predetermined fuel level to be selected by the motorist. When the magnitude of the pulse amplitude appearing across resistor 36 is at a predetermined triggering level, the SCR 44 is triggered into its conducting state permitting current to flow from the twelve volt supply through self-flashing lamp 16 and SCR 44. When the lamp flashes, current ceases to flow through it because of its built-in thermal actuation, but SCR 44 will again be triggered into its conducting state by means of a succeeding triggering pulse appearing across resistor 36. When fuel is added to the tank, float 28 causes wiper arm 20 to again move towards the ground side 28 of resistor 22, thereby decreasing the voltage appearing across resistor 36 which will eventually be below the level required to trigger the SCR into its conducting state. Wave shaping network 24 connected between wiper arms 20 and 34 has a relatively fast time constant thereby sharpening the pulse applied to the gate electrode 40 of SCR 44.

A latitude of modification, substitution and change is intended in the foregoing disclosure, and in some instances, some features of the invention will be employed without a corresponding use of other features.

We claim:

1. A level sensing warning system for use with a tank having a liquid therein and for providing a warning when the level of a liquid held in a tank reaches a predetermined level comprising visual warning means for providing a visual warning when said liquid reaches said predetermined level, first means for sensing the level of said liquid, said first means including a variable resistor provided with a wiper arm, second means responsive to said first means for actuating said visual warning means when said liquid reaches said predetermined level, said warning means including flashing lamp means for providing a flashing visual signal, a silicon controlled rectifier device having a gate terminal, said device being triggered into a conducting state when a signal from said second means of a predetermined amplitude is applied to said gate terminal, said device being connected to said flashing lamp means, said first means being provided with a source or periodic pulses supplied to said wiper arm so that a pulse amplitude level is developed across said variable resistor responsive to the level of said liquid, said pulse developed across said variable resistor being supplied to said second means, said second means being connected for supplying a pulse to said gate terminal, so that when said liquid is at said predetermined level said device is triggered into its conducting state actuating said warning means, said second means being provided with wave shaping means connected between said wiper arm and said gate electrode for shaping the pulse appearing at said gate terminal.

2. A level sensing warning system as set forth in claim 1, wherein said wave shaping means includes a resistor and a capacitor connected in parallel.

3. A level sensing warning system as set forth in claim 1, wherein said flashing lamp is provided with a thermal switch for turning said lamp off after it is turned on, said liquid being gasoline and said tank being a gasoline fuel tank, said first means being provided with a fuel guage connected between said source of periodic pulses and said wiper arm, a float resting on top of said gasoline in said fuel tank, said float being connected to said wiper arm, and said second means being provided with a variable resistor for adjusting the amplitude of the pulse supplied to said gate terminal.

* * * * *